United States Patent [19]

Anderson et al.

[11] Patent Number: 4,469,120

[45] Date of Patent: Sep. 4, 1984

[54] FLUID PRESSURE AND SIGNAL CONTROLLER

[75] Inventors: Patrick J. Anderson, Batavia; Robert D. Forschler, Roselle, both of Ill.

[73] Assignee: Eaton Corporation, Cleveland, Ohio

[21] Appl. No.: 412,681

[22] Filed: Aug. 30, 1982

[51] Int. Cl.$^3$ ............................................. F15B 5/00
[52] U.S. Cl. .............................. 137/85; 200/153 LA; 200/77; 251/251
[58] Field of Search ............ 200/153 LA, 77; 74/107, 74/104, 53, 569, 567, 568 R; 251/251; 137/85, 84, 82

[56] References Cited

U.S. PATENT DOCUMENTS 2,837,118 6/1958 Allen .............................. 137/624.17
4,315,521 2/1982 Anderson et al. ..................... 137/85

Primary Examiner—Alan Cohan
Assistant Examiner—Mark Malkin
Attorney, Agent, or Firm—A. E. Chrow; R. A. Johnston; C. H. Grace

[57] ABSTRACT

Disclosed is a fluid pressure and signal controller (60) that is adapted to regulate a fluid pressure regulator (16) by means of rotation of a cam (24) in response to rotation of a shaft. The controller is additionally provided with means for generating signals at one or more predetermined positions on the cam by movement of an output member (48) that is in contact with a profiled surface (40, 40') of a body member (38) which in turn is caused to move in response to movement of a cam follower (42) that is in contact relationship with the cam. Means are provided such as threads (51) are provided for adjusting the rotative position of the body member with respect to the position of the cam follower to account for any change in the initial position of the cam member and to enable more than one of the signal generation means to be positioned at different locations about the cam.

28 Claims, 5 Drawing Figures

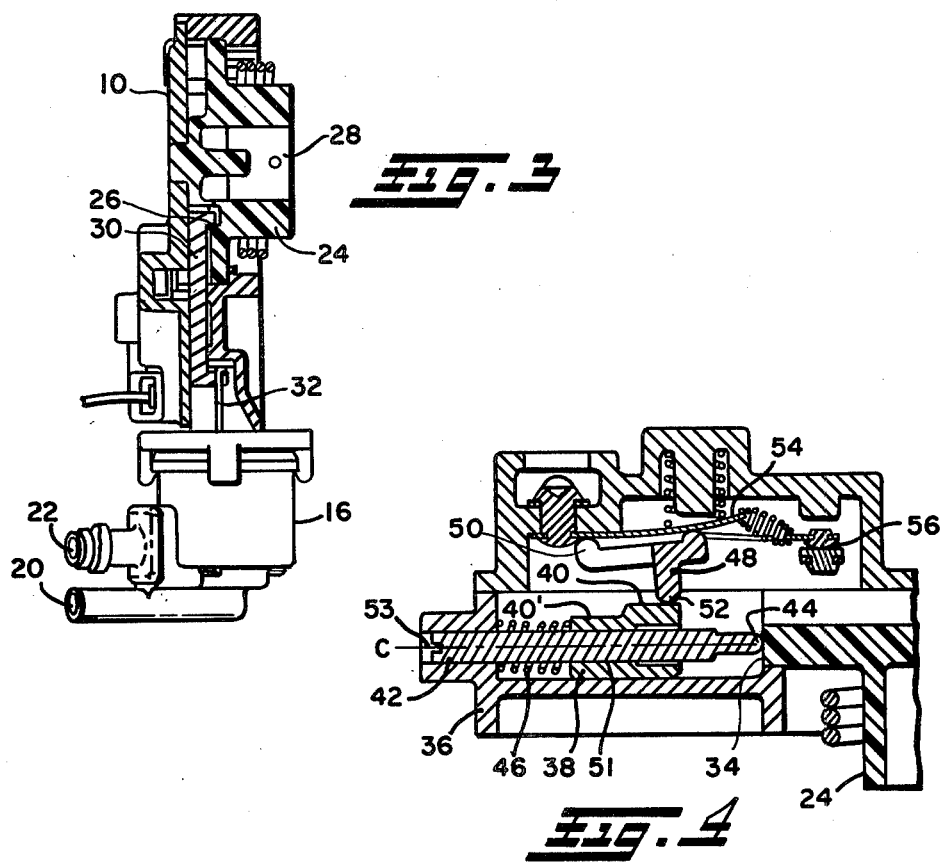
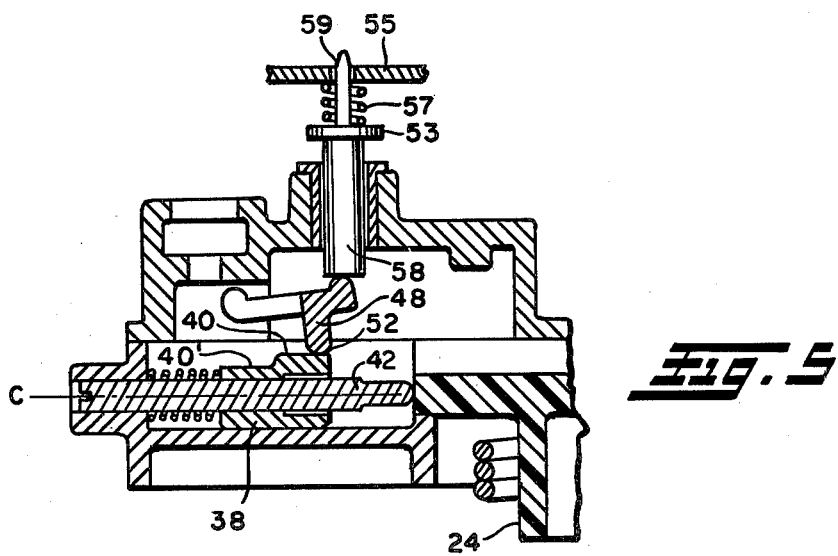

FLUID PRESSURE AND SIGNAL CONTROLLER

BACKGROUND OF THE INVENTION

This invention is related to a controller for regulating fluid pressure that is also able to provide an additional signal and more particularly to a controller that is adapted to regulate fluid pressure, particularly vacuum pressure, in response to rotation of a cam and is able to provide at least one additional calibratable signal at a predetermined position of the cam. This invention is an improvement to the Fluid Pressure Signal Controller disclosed in U.S. Pat. No. 4,315,521 owned by the assignee of the present invention.

DESCRIPTION OF THE PRIOR ART

It is known to provide a rotary cam for adjusting the bias force on a pressure force-balance type vacuum modulator value for adjusting the level of a regulated vacuum output signal. An example of such devices are respectively disclosed in U.S. Pat. Nos. 4,245,789 and 4,316,479 owned by the assignee of the present invention.

It is also known to provide a fluid pressure signal controller that, in addition to providing a regulated vacuum output signal in response to the rotation of a cam (as for example a cam secured to an engine throttle shaft) is also able to make or break an electrical circuit at a predetermined position of the cam so that the movement of the cam (throttle position) also provides an electrical signal that may be used for various functions such as to activate and deactivate an electrically operated transmission shaft control mechanism. An example of such device is disclosed in U.S. Pat. No. 4,315,521 owned by the assignee of the present invention.

Although the prior art cam-driven fluid pressure regulators hereinbefore described may be used to advantage to provide a regulated fluid pressure signal in response to rotation of a cam, they are not able to additionally make or break one or more electrical circuits or provide a signal of any type such that the responsiveness to making or breaking at least one of the circuits, or the ability to provide a signal of any type, may be varied as desired without having to change or otherwise alter the cam or the position of the cam controlling the particular circuit or signal.

Such prior art devices are also not able to alter the relationship between the cam and the means actuating the additional signal, in the event that the initial position of the cam is changed to alter the manner in which the fluid pressure is regulated in response to rotation of the cam, nor are they able to provide at least one signal at two or more predetermined positions on the cam with a single actuation means.

SUMMARY OF THE INVENTION

Accordingly, it is an object of this invention to provide a fluid pressure and signal controller that is able to regulate fluid pressure, whether above or below atmospheric pressure, in response to the rotation of a cam in addition to providing at least one additional signal at a predetermined position on the cam.

It is another object of this invention to provide a fluid pressure and signal controller that is able to regulate fluid pressure, whether above or below atmospheric pressure, and which is also able to provide at least one additional signal at a predetermined position on the cam, which position can be adjusted relative to the at-rest position of the cam for altering the fluid pressure regulating characteristics of the controller as function of cam rotation.

It is yet another object of this invention to provide a fluid pressure and signal controller that is able to regulate fluid pressure, whether above or below atmospheric pressure, in response to the rotation of a cam and to provide at least one additional signal predetermined by the position of the cam whose responsiveness can be adjusted without the necessity of having to alter or replace the cam.

It is still another object of this invention to provide a fluid pressure and signal controller able to economically regulate fluid pressure, whether above or below atmospheric pressure, in response to rotation of a cam and to provide at least one additional signal at each of two or more predetermined positions on the cam by means of a single actuator component which provides for sufficient adjustment to account for different dimensional characteristics of the cam at the two or more predetermined positions.

The present invention thus provides for individual calibration of plural signal devices each activated by common rotation of a cam by providing for individual adjustment of the signal devices with respect to the common rotation.

BRIEF DESCRIPTION OF THE DRAWINGS

FIG. 3 shows a cross-sectional view of the pressure regulation components along line 3—3 of the fluid pressure and signal controller of FIG. 1;

FIG. 4 shows a cross-sectional view along line 4—4 of one of the actuator means of the controller of FIG. 1 that is adapted to actuate an electrical switch; and FIG. 5 shows a cross-sectional view of the actuator means of FIG. 4 that has been modified to provide a hydraulic or pneumatic signal rather than an electrical signal.

DESCRIPTION OF THE PREFERRED EMBODIMENT

Figure 1:
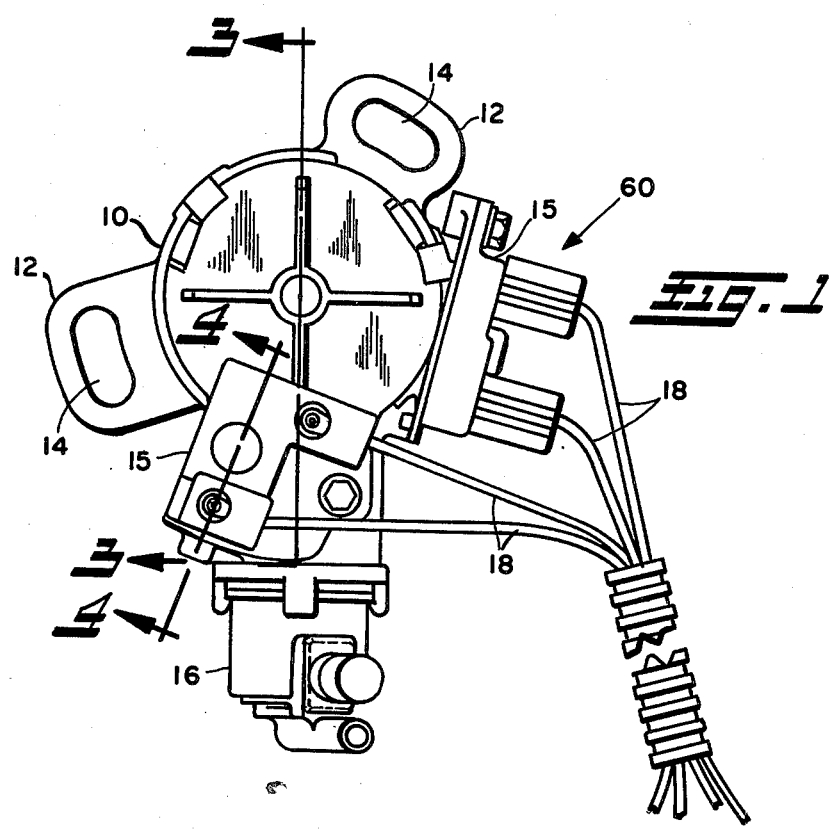
FIG. 1 shows a plan view of an embodiment of the fluid pressure and signal controller of the invention.

FIG. 1 shows an embodiment of the fluid pressure and signal controller of the invention in the form of controller 60. Controller 60 has a housing or body means 10 rotatably connected to housing 16 of a vacuum regulator or modulator valve.

Housing 10 has a pair of flanges 12 having arcuate slots 14 which enable housing 10 to be mounted to a suitable support and which also enables housing 10 to be rotated relative housing 16 to the extent provided by the circumferential length of slots 14. The rotation of housing 10 enables electrical switches 15 to be positioned relative to a rotatable cam as hereinafter described with respect to FIG. 3. Each electrical switch 15 is able to either open or close an electrical circuit by means of insulated conductors 18 respectively connecting each switch 15 to the particular electric circuit. Electrical switches 15 are actuated by actuator means respectively having second and third cam follower means in response to rotation of cam member of which one of the actuator means is hereinafter described with respect to FIG. 3.

Figure 2:
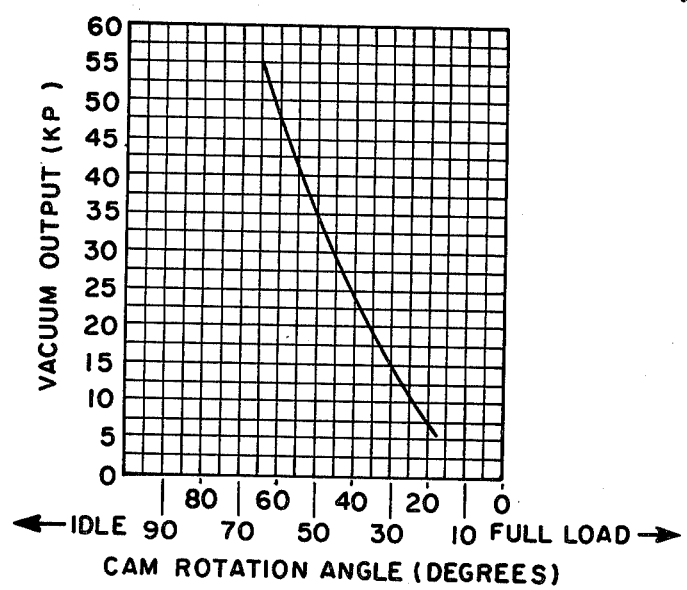
FIG. 2 shows a graph of regulated vacuum output from the fluid pressure and signal controller of FIG. 1.

FIG. 2 shows a typical regulated vacuum output curve of the controller of FIG. 1. Although controller 60 is designed to alter vacuum output in accordance with the rotational position of a cam member determined by the rotation of a shaft which is a function for example of an engine throttle position, embodiments of the invention include controllers that are able to regulate fluid pressure above atmospheric in combination with actuating one or more signals of any type that may be of use in a particular application.

In FIG. 2, as the throttle is actuated to increase engine speed from idle to full, the regulated vacuum output decreases as shown in FIG. 2 as the cam member rotates approximately 50°. The manner in which the vacuum is regulated is more fully described with respect to FIG. 3.

FIG. 3 shows a cross-section along line 3—3 through controller 60 of FIG. 1 illustrating the manner in which controller 60 is able to regulate vacuum from a variable vacuum source. The vacuum modulator valve having housing 16 has an input port 20 for receiving a source of vacuum. Regulated vacuum is delivered from housing 16 through outlet port 22. Contained within housing 16 is a flexible diaphragm, not shown, which divides housing 16 into two internal chambers of which one is a vacuum chamber and the other is an atmospheric pressure chamber is well known to those ordinarily skilled in the art of vacuum modulator valves. The diaphragm is caused to move in response to the movement of linking member 32 and by means of a venting valve is able to bleed vacuum from the vacuum chamber and maintain a particular vacuum output for a particular position of linking member 32 as is well known to those ordinarily skilled in the art of diaphragm actuated vacuum modulation valves.

Linking member 32 is connected to one end of connecting member 30 as shown in FIG. 3. Connecting member 30 is a cam follower means that is slidably mounted in a vertical position within controller 60 and has a surface at the opposite end riding upon surface 26 of cam member 24. Cam member 24 is rotatably mounted within housing 10 and has a bore 28 for receiving a rotatable shaft, not referenced, which causes cam member 24 to rotate in response to rotation of the shaft which, for example, may be a function of the throttle position of an internal combustion engine. Generally, the rotation of cam member 24 is less than 360° for a throttle position from idle to full load. Surface 26 of cam member 24 is shaped so that rotation of cam member 24 causes surface 26 to raise and lower cam follower 30 in the manner desired which in turn raises and lowers linking member 32 to effect a bias on the diaphragm to regulate vacuum within the vacuum chamber as previously described. Thus, controller 60 is able to regulate vacuum in the manner shown in FIG. 2 by means of the rotation of cam member 24 whose rotation is a function of the rotation of a rotatable shaft that is rotated, for example, as a function of throttle position. In addition to regulating vacuum, controller 60 also is able to activate a signal at one or more predetermined positions for cam member 24 as hereinafter described with respect to FIGS. 4 and 5.

FIG. 4 shows a cross-sectional view of one of the electrical switches 15 actuated by controller 60 of FIG. 1. Switch 15 may be normally open or normally closed as desired for a particular application. Switch 15 is actuated by an initiation or output member 48 which is pivotably mounted at pivot 50 such that member 48 is able to rotate about pivot 50 and move contact arm 54 which, depending upon the design, is able to open or close an electrical circuit at contact point 56. It is to be understood that the component arrangement of switch 15 shown in FIG. 4 is only one manner in which controller 60 is able to generate an electrical signal by means of opening or closing an electrical circuit and that output member 48 may be any member having any type of movement able to generate the electrical signal and is not limited to the rotation of output member 48 as shown in FIG. 4.

Output member 48 is moved by actuator means having components hereinafter described. Body member 38 is mounted moveably on cam follower means in the form of shaft 42. Body member 38 is moveable with respect to cam member 24, frame 36 and output member 48. An extension 52 of output member 48 is in contacting relationship with profiled surface 40 of body member 38 such that movement of body member 38 to the viewer's right will cause extension 52 to follow along surface 40 and drop to continuation surface 40' which in turn causes output member 48 to rotate clockwise and close contact 56.

Frame 36 may be any frame associated with the actuator means that enables body member 38 and shaft 42 to cooperate with each other in the manner hereinafter described. At least one of body member 38 and shaft 42 is moveably supported by frame 36. Preferably, both body member 38 and shaft 42 are slidingly engaged with frame 36. Shaft 42 is adapted to move to the viewer's right or left in FIG. 4. Shaft 42 has a surface 44 at one end that is in contacting relationship with surface 34 of cam member 24. Although surface 34 is a preferably a different surface of cam member 24 than surface 26 previously described with respect to FIG. 3 for regulating vacuum, in certain instances surface 34 may be the same as surface 26 where a surface of shaft 42 is adapted to ride on surface 26. Although only one cam member 24 is used in controller 60, it is to be understood that controllers of the invention include one or more cam members rotatably mounted on the rotatable shaft and which are individually designed to respectively regulate vacuum or fluid pressure above atmospheric and generate a signal at predetermined positions on the respective cam members where such is desired.

Rotation of cam member 24 causes surface 34 to move shaft 42 to the viewer's right or left and open or close contact 56 at a predetermined position on cam member 24. Shaft 42 is a rotatable shaft whose rotation is enhanced by means such as groove 53 disposed in the end of shaft furthest away from cam members 24. Shaft 42 has positioning means in the form of a threaded portion having threads 51. At least a portion of threads 51 are threadably engaged with at least a portion of corresponding threads disposed on body member 38 as shown in FIG. 4. Body member 38 is restricted against rotation with respect to shaft 42 such that rotation of shaft 42 about its central longitudinal rotational axis "C" enables the position of body member 38 relative shaft 42 to be adjusted by causing body member 38 to move along shaft 42 in one direction and rotation of shaft 42 in an opposite direction causes body member 38 to move along shaft 42 in a direction opposite to the one direction. For example, when shaft 42 is rotated clockwise, body member 38 moves along shaft 42 to the viewer's right towards cam member 24 and, when shaft 42 is rotated in a counterclockwise direction, body member 38 moves along shaft 42 to the viewer's left away from cam member 24. Although body member 38 is preferably in the form of a nut disposed coaxially about shaft 42 as shown in FIG. 4, body member 38 may be disposed adjacent shaft 42 where such is desired provided some type of engagement between shaft 42 and body member 38 causes body member 38 to be positioned along shaft 42 in response to the rotation thereof. Thus body member 38 is able to be adjustably positioned along shaft 42 which in turn places extension 52 of output member 48 in a different position on profiled surface 40 or 40' and consequently changes the response of output member 48 to movement of shaft 42 in response to rotation of cam members 24. Threads 51 not only provide the positioning means for positioning body member 38 along shaft 42, but also enable body member 38 to be moved in response to the movement of shaft 42 in response to rotation of cam member 24.

Means for biasing the cam follower, preferably in the form of shaft 42, is preferably included as a component of the actuator means to ensure a contacting relationship between the cam and the cam follower. Preferably, the biasing means is a resilient biasing means in the form of coiled spring 46 preferably disposed coaxially about shaft 42 against body member 38 in such a manner as to bias body member 38 and shaft 42 towards cam member 24 to insure a contacting relationship between surface 44 of shaft 42 and surface 34 of cam member 24 during the rotation of cam member 24. Although preferably in the form of at least one coiled spring preferably disposed coaxially about shaft 42 as shown in FIG. 4, the biasing means may be any suitable biasing means such as a resilient material which when compressed between frame 36 and either body member 38 and/or a surface of shaft 42 is able to bias shaft 42 towards cam member 24.

The components of the actuator means thus comprise a moveable body member that is moveably mounted with respect to a frame and has a profiled surface in contacting relationship with an output member. Movement of the body member causes the profiled surface to move the output member sufficiently to actuate a signal at a predetermined position of a cam member whose rotation is able to move a cam follower means that cooperates with and causes the body member to move in response to movement of the cam follower means. Positioning or calibration means associated with both the body member and the calibration member enables the position of the body member relative the position of the cam follower means to be changed to alter the movement of the output member in response to rotation of the cam member in the manner desired and biasing means is preferably included as part of the actuator components to ensure a contacting relationship between a surface of the cam follower means and the cam member.

The actuator means able to move the output member sufficiently to actuate the signal generation means at a predetermined position of the cam member is thus calibratable (adjustable) so that the movement of the output member can be altered to account for rotation of the housing enclosing the cam member to alter the regulated fluid pressure output of the controller of the invention and enable two or more of such signal generation means to be secured to the housing about the periphery of the cam member that can be individually calibrated to provide the type of movement desired of the output member at predetermined positions on the cam member.

FIG. 5 illustrates the signal generation means as embodied in a hydraulic circuit or pneumatic system. In FIG. 5, arm 54 of the FIG. 4 embodiment, has been replaced with piston 58 having one end in contacting relationship with output member 48 which in turn has extension 52 thereof in contacting relationship with surface 40 of body member 38 such that movement of body member 38 and cam follower means 42 in response to the rotation of cam member 24 causes extension 52 to ride along profiled surface 40 and 40' which moves piston 58 in one direction or in an opposite direction along its central longitudinal axis depending on the direction of movement of body member 38.

Needle valve 59 extends from an opposite end of piston 58 as shown in FIG. 5. Valve 59 is adapted to open and close an orifice, not shown, through which an hydraulic fluid or gas, such as air, is flowing such that the movement of valve 59 is able to generate an hydraulic or other type of fluid signal at a predetermined position on cam 24. Biasing means in the form of coiled spring 57 is disposed between a shoulder 53 of piston 58 and a restraining member 55 to bias piston 58 towards initiation member 48 to ensure a contacting relationship therebetween during the rotation of cam member 24.

Although the actuator means preferably comprises a moveable body member that is disposed coaxially about a cam follower means, preferably in the form of a threaded shaft (screw) as previously described, such that the movement of the body member is substantially parallel to the central longitudinal rotational axis of the shaft, the body member and cam follower means may have any shape and undergo any type of movement provided that means are provided to move the body member in response to movement of the cam follower means in response to the rotation of the cam member with the body member having a profiled surface that is able to move an output member at a predetermined position on the cam member an amount sufficient to actuate the signal desired and positioning means are provided for adjusting the position of the body member relative the position of the cam follower means as desired and which preferably further includes biasing means that is able to bias a surface of the cam follower against the cam member to insure a contacting relationship therebetween during rotation of the cam member.

The fluid pressure and signal controller of the invention may be made from any material suitable for a particular application. Although the cam member or members may be made from metal, it may also be made from a suitable synthetic molding material where such is desired.

What is claimed is:

1. An improved fluid pressure and signal controller of the type having at least one rotatable cam member adapted to regulate fluid pressure output of a vacuum modulator valve in response to changes in position of a rotatable input shaft in addition to having switch means associated therewith having means directly contacting the cam member that actuate the switch means to open or close an electrical circuit at a predetermined position on the cam member, said improved controller characterized by regulating fluid pressure both above and below atmospheric pressure and having at least one calibratable actuator means for actuating a signal generation means at a predetermined position on the cam member, said actuator means having component means associated therewith for adjusting the movement of an output member of the actuator means in response to the rotation of the cam member to account for any repositioning of the cam member undertaken to alter the fluid pressure regulation characteristics of the controller and to adjust the sensitivity of the actuator means where desired, said component means comprising:

a frame secured against movement with respect to the cam member, a body member moveably disposed with respect to the frame and the cam member, said body member having a profiled portion thereof that is adapted to contact an output member and cause the output member to actuate the signal generation means at a predetermined position on the cam, cam follower means disposed moveably with respect to the cam member and the body member and the frame, said cam follower means having a portion thereof adapted to contact the cam member and cause the cam follower means to move with respect to the frame and the cam member in response to rotation of the cam member with at least one of said body member and said cam follower means supported by the frame, means causing the body member to move in response to the movement of the cam follower, and adjustable positioning means for changing the position of the body member relative the position of the cam follower, said frame and body member and cam follower means operably cooperating with each other in such a manner that movement of the cam follower means in response to rotation of the cam member causes the body member to move in response to the movement of the cam follower means which causes the profiled portion of the body member to press against the output member and move the output member sufficiently to actuate the signal generation means at a predetermined position on the cam member and adjustment of the positioning means changes the relative position between the cam follower means and the body member and causes the position of the profiled portion of the body member to change with respect to the position of the output member and change the movement of the output member in response to movement of the body member in the amount desired.

2. The controller of claim 1, including means for biasing the cam follower means against the cam member to ensure a contacting relationship therebetween during the rotation of the cam member.

3. The controller of claim 1, wherein the output member is a lever arm pivotably mounted at one end thereof and having a surface thereof adapted to be pressed against by the body member profiled portion in such a manner that the movement of the body member in response to the movement of the cam follower means causes the lever arm to rotate about the pivotal mounting for an amount sufficient for the lever arm to actuate the signal generation means.

4. The controller of claim 1, wherein the signal generation means is an electrical switch of which the actuation thereof opens or closes an electrical circuit.

5. The controller of claim 1, wherein the signal generation means is a hydraulic signal means and the signal is a hydraulic signal.

6. The controller of claim 1, wherein the signal generation means is a pneumatic signal means and the signal is a pneumatic signal.

7. The controller of claim 1, wherein the body member has a threaded portion and the cam follower means comprises a rotatable shaft having a threaded portion and having a central longitudinal rotational axis extending between opposite ends thereof and the means causing the body member to move in response to the movement of the cam follower means is provided by means of engagement between at least a portion of the threads of the body member and the shaft threaded portions with the body member restricted against rotation with respect to the shaft to the extent that rotation of the shaft in one direction about the central longitudinal rotational axis thereof causes the body member to move in one direction along the shaft and rotation of the shaft in an opposite direction about the central longitudinal rotational axis thereof causes the body member to move in an opposite direction along the shaft and the means for adjusting the position of the body member relative to the position of the shaft comprises turning the shaft in either the one direction or the opposite direction an amount sufficient to enable the body member to move in the one direction or in the opposite direction along the shaft for the distance desired.

8. The controller of claim 7, wherein the portion of the cam follower means adapted to contact the cam member comprises a surface portion of the end of the shaft closest to the cam member.

9. The controller of claim 7, wherein the body member is disposed coaxially about the shaft and the direction of movement of the body member in the one direction and in the opposite direction along the shaft is substantially parallel to the central longitudinal rotational axis of the shaft.

10. The controller of claim 7, wherein the biasing means is positioned in such a manner as to bias the body member towards the cam member and cause at least a portion of the threads thereof to press against at least a portion of the threads of the shaft and bias the shaft portion towards the cam member for a distance sufficient to insure the contacting relationship therebetween during the rotation of the cam member.

11. The controller of claim 10, wherein the biasing means comprises at least one coiled spring.

12. The controller of claim 10, wherein the biasing means is disposed coaxially about the shaft.

13. The controller of claim 12, wherein the biasing means comprises at least one coiled spring.

14. The controller of claim 7, wherein the body member is slidably engaged with a surface of the frame and is caused to slide along the frame surface in a direction towards the cam member in response to movement of the shaft towards the cam member and is caused to slide along the frame surface in a direction away from the cam member in response to movement of the shaft away from the cam member.

15. The controller of claim 7, including means for turning the shaft in the one direction and in the opposite direction.

16. The controller of claim 15, wherein the means for rotating the shaft comprises a groove in the end of the shaft furthest away from the cam member.

17. An improved fluid pressure and electrical signal controller of the type having at least one rotatable cam member adapted to regulate fluid pressure output of a vacuum modulator valve in response to changes in position of a rotatable input shaft in addition to having electrical switch means having cam follower means associated therewith directly contacting the cam member that causes an output member to actuate the switch means to open or close an electrical circuit at a predetermined position on the cam member, said improved controller characterized by regulating fluid pressure both above and below atmospheric pressure and having one or more signal generation means having actuator means of which at least one thereof is calibratable by having component means for adjusting the movement of the actuator means in response to the rotation of the cam member, said actuator component means comprising:

a frame secured against movement with respect to the cam member, a rotatable shaft moveably mounted with respect to the frame, said shaft having a threaded portion and having another portion thereof in contacting relationship with the cam member, a body member slidingly engaged with a surface of the frame and restricted against rotation with respect to the shaft, said body member having a profiled surface adapted to contact the output member and cause the output member to actuate the signal generation means at a predetermined position on the cam member and having a threaded portion of which at least a portion of the threads thereof are threadedly engaged with at least a portion of the threads of the shaft threaded portion, such that rotation of the shaft in one direction causes the body member to move along the shaft towards the cam member and rotation of the shaft in the opposite direction causes the body member to move along the shaft away from the cam member, biasing means disposed against the body member in such a manner as to bias the body member towards the cam member, said frame and shaft and body member and biasing means operably cooperating with each other such that, for a particular location of the body member along the shaft, the profiled surface of the body member is in contacting relationship with the output member while the biasing means biases the body member and the shaft towards the cam member by means of the threaded engagement therebetween and presses the shaft portion against the cam member to insure a contacting relationship therebetween during rotation of the cam and rotation of the cam causes the shaft to move which in turn causes the body member to slide for a distance along the frame surface sufficient for the profiled surface of the body member to move the output member an amount sufficient to actuate the signal generation means at the predetermined position on the cam member and rotation of the shaft in the one direction or in the opposite direction causes the body member to move along the shaft respectively in the one direction or in the opposite direction for a distance sufficient to cause the profiled surface of the body member to move the output member so as to adjust the amount of movement required of the output member to actuate the signal generation means.

18. The controller of claim 17, wherein the body member is disposed coaxially about the shaft and the direction of movement of the body member in the one direction and in the opposite direction is substantially parallel to the central longitudinal rotational axis of the shaft.

19. The controller of claims 17 or 18, wherein the biasing means is disposed coaxially about the shaft.

20. The controller of claim 19, wherein the biasing means comprises at least one coiled spring.

21. The controller of claim 17, wherein the signal generation means is an electrical switch means which opens or closes an electrical circuit when actuated by the output member.

22. The controller of claim 17, wherein the shaft portion in contacting relationship with the cam member comprises a surface portion of the end of the shaft closest to the cam member.

23. The controller of claim 17, including means for rotating the shaft in the one direction and in the opposite direction.

24. The controller of claim 23, wherein the means for rotating the shaft comprises a groove in the end of the shaft furthest away from the cam member.

25. The controller of claim 17, wherein the output member is a lever arm pivotably mounted at one end thereof and having a surface thereof adapted to be pressed against by the body member profiled portion in such a a manner that the movement of the body member in response to the movement of the shaft causes the lever arm to rotate about the pivotal mounting for an amount sufficient for the lever arm to actuate the signal generation means.

26. The controller of claim 17, wherein the signal generation means is a hydraulic signal generation means and the signal is a hydraulic signal.

27. The controller of claim 17, wherein the signal generation means is a pneumatic signal generation means and the signal is a pneumatic signal.

28. A fluid pressure signal controller comprising:
(a) frame means;
(b) modulator valve means mounted on said frame means, operable upon connection to a source of fluid pressure to provide a fluid pressure output signal modulated at a predetermined level;
(c) cam means moveably received upon said frame means and adapted for connection to a rotatable shaft for receiving a movement input therefrom;
(d) first cam follower means operable upon rotation of said cam means for effecting a bias on said modulator valve means for altering said output signal;
(e) second and third cam follower means disposed on said body means each including a moveable output member and individually operative upon rotation of said cam means to effect movement of said output member upon a predetermined rotation of said cam means, said second and third cam follower means including calibration means operable upon adjustment to individually alter the amount of said predetermined rotation of said cam means required for effecting movement of said individual moveable output members wherein at least one of said calibration means includes an adjustment screw having one end thereof contacting said cam means and a nut received thereon and guided for sliding movement on said body means upon rotation of said adjustment screw, said nut having a cam surface thereon for effecting movement of said output member; and
(f) signal means operative upon sensing movement of each of said output members to provide an output control signal.

* * * * *